United States Patent
Ruan (10) Patent No.: US 9,371,879 B2
(45) Date of Patent: Jun. 21, 2016

(54) PSEUDO-LINEAR HYDRO-PNEUMATIC SPRING

(71) Applicant: ITT Manufacturing Enterprises LLC, Wilmington, DE (US)

(72) Inventor: Shubin Ruan, Williamsville, NY (US)

(73) Assignee: ITT Manufacturing Enterprises LLC, Wilmington, DE (US)

(*) Notice: Subject to any disclaimer, the term of this patent is extended or adjusted under 35 U.S.C. 154(b) by 0 days.

(21) Appl. No.: 14/497,543

(22) Filed: Sep. 26, 2014

(65) Prior Publication Data

US 2015/0115512 A1 Apr. 30, 2015

Related U.S. Application Data

(60) Provisional application No. 61/898,197, filed on Oct. 31, 2013.

(51) Int. Cl.
*F16F 9/06* (2006.01)
(52) U.S. Cl.
CPC .......................... *F16F 9/065* (2013.01)
(58) Field of Classification Search
CPC ....... F16F 13/002; B60G 17/00; B60G 17/04; B60G 11/26
USPC ....................... 280/6.12, 708, 714, 6.11, 702; 267/64.15, 64.16, 64.25, 140.11, 254, 267/255
See application file for complete search history.

(56) References Cited

U.S. PATENT DOCUMENTS

| | | | | |
|---|---|---|---|---|
| 3,761,110 A | * | 9/1973 | Grosseau | B60G 11/26 67/64.11 |
| 4,648,466 A | * | 3/1987 | Baker | A01C 7/205 172/260.5 |
| 5,271,632 A | * | 12/1993 | Glaser | B60G 9/02 280/124.112 |
| 5,547,211 A | * | 8/1996 | Runkel | B60G 11/30 267/64.15 |
| 6,145,859 A | * | 11/2000 | Altherr | B60G 9/003 280/124.116 |
| 7,546,911 B2 | * | 6/2009 | Honma | B60G 17/0432 188/266.2 |

FOREIGN PATENT DOCUMENTS

JP 3-26270 A * 11/1991

* cited by examiner

*Primary Examiner* — Melanie Torres Williams
(74) *Attorney, Agent, or Firm* — Barclay Damon, LLP (57) ABSTRACT

A pseudo-linear hydro-pneumatic isolation spring includes a cylinder having an interior partially filled with a hydraulic fluid as well as a piston assembly that is movably disposed within the cylinder including a piston head and a piston rod. A plurality of accumulators are fluidically connected to the interior of the cylinder in parallel, each of the accumulators being charged to a different pressure and size so as to actively engage the cylinder only after a threshold pressure force based on fluid displacement of the piston in the cylinder has been reached.

11 Claims, 5 Drawing Sheets

PSEUDO-LINEAR HYDRO-PNEUMATIC SPRING

CROSS REFERENCE TO RELATED APPLICATION

This application claims priority from U.S. Provisional Patent Application Ser. No. 61/898,197, filed Oct. 31, 2013, entitled: "Pseudo-Linear Hydro-Pneumatic Spring", the entire contents of which is incorporated herein by reference.

TECHNICAL FIELD

This application generally relates to the field of load isolation and damping systems, and more specifically to a hydro-pneumatic spring isolator that can be suitably and repeatably controlled to produce a substantially linear spring force output over its stroke.

BACKGROUND OF THE APPLICATION

Figure 1:
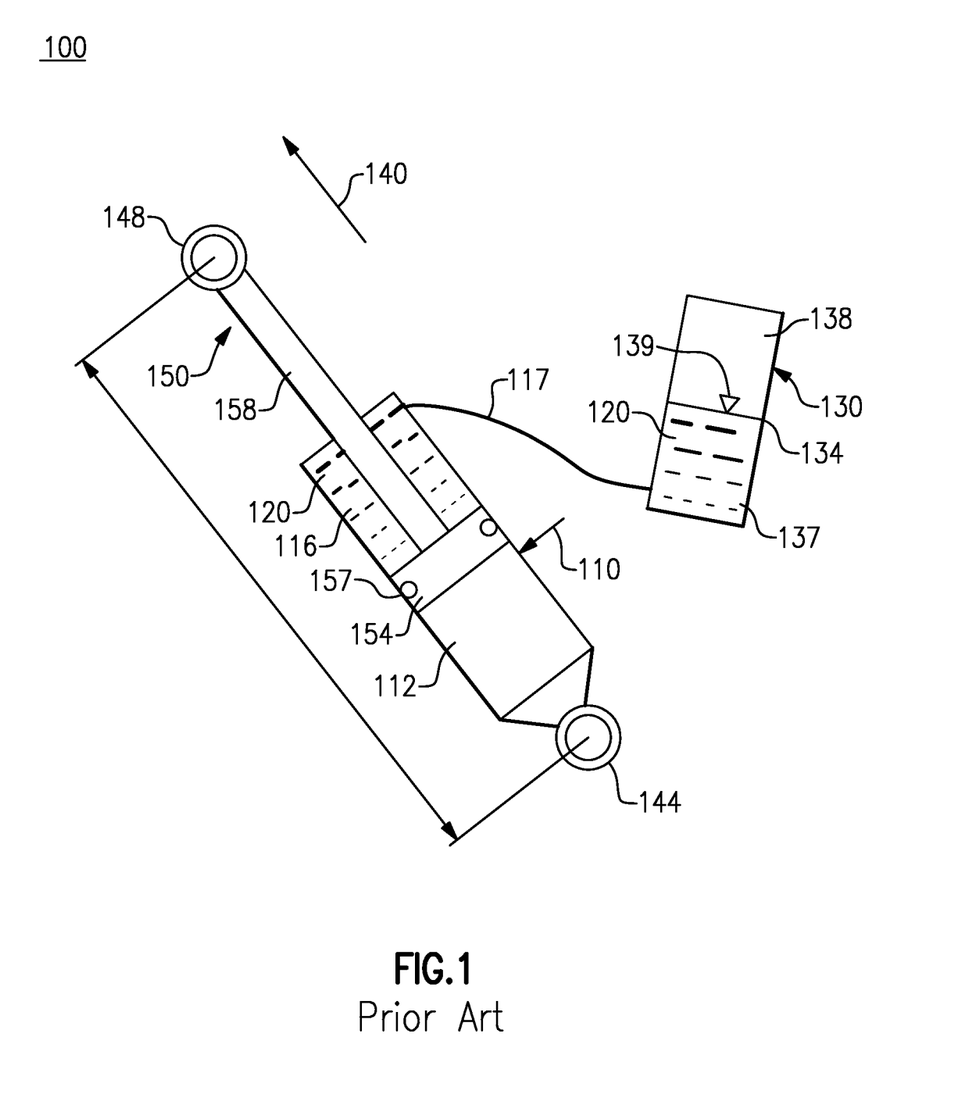
FIG. 1 is a partially sectioned view of a known hydro-pneumatic spring isolation assembly.

It is known in various structural assemblies and the like to provide at least one or a plurality of isolation assemblies in regard to applied loads. One such isolation assembly 100, depicted in FIG. 1, is a hydro-pneumatic spring that is defined by a hydraulic cylinder 110 having a quantity of hydraulic fluid 120 disposed in a chamber 116, as well as an accumulator 130 that is fluidically attached to the cylinder 110. The accumulator 130 is defined by a sealed vessel 134 that includes a quantity of a compressible gas such that movement of a contained piston assembly 150 within the cylinder 110 under load compresses the contained hydraulic fluid 120 and produces a force that overcomes a charging gas pressure of the accumulator 130. As a result, a spring force is produced to effect support of an applied load, such as a tensile load, shown by arrow 140.

It is known that the resulting spring force of these latter assemblies is not linear over the range of the axial stroke of the piston within the cylinder, which is affected by numerous factors including temperature and gas volume. It would be advantageous to improve upon these isolation assemblies to enable linearity in the function of spring force to piston stroke (travel).

BRIEF DESCRIPTION

In accordance with one aspect, there is provided a pseudo-linear hydro-pneumatic isolator assembly that comprises a cylinder having an interior partially filled with a hydraulic fluid. A piston assembly, including a piston head and a piston rod attached to one end is movable within the interior of the cylinder and defines a variable hydraulic chamber. At least two accumulators are fluidically connected in parallel with the defined variable hydraulic chamber of the cylinder, the at least two accumulators being configured to provide a pseudo linear spring force over an axial stroke of the piston assembly.

According to at least one version, each accumulator comprises a vessel that is charged with a compressible gas in which a first accumulator is charged to a first pressure and a second adjacent accumulator is charged to a second pressure that is higher than the first pressure.

Displacement of the piston creates a variable pressure force, this variable pressure force causing active engagement of each accumulator in sequence, but only after the variable pressure force first exceeds the charging pressure of the first and second accumulators.

In at least one embodiment, a third accumulator can be disposed in parallel with the first and second accumulator, the third accumulator being charged to a third pressure that is higher than either the first and the second pressure, each said pressure defining a threshold pressure.

Each accumulator can includes a different initial gas volume and/or charging gas volume. In a preferred version, a disposed arrangement of N accumulators are fluidically connected with the hydraulic chamber of the hydro-pneumatic spring and in which each succeeding accumulator is progressively larger in at least one of volume and charging pressure.

In accordance with another aspect, there is provided a method for substantially linearizing a hydro-pneumatic spring isolation assembly. The method comprises the steps of providing a cylinder having an interior hydraulic chamber and a piston assembly movable to vary the size of the hydraulic chamber; and connecting at least two accumulators to the interior hydraulic chamber of the cylinder, each of the accumulators having a different charging pressure such that the accumulators are actively engaged only after the charging pressure of each accumulator is exceeded by a pressure force from displacement of fluid from the hydraulic chamber.

In one version of this method, each accumulator can be provided in parallel. According to one embodiment, N accumulators can be disposed in parallel, each of the N accumulators having a progressively higher charging gas pressure and/or initial gas volume. In one exemplary version, each of said N accumulators can be defined with a progressively greater initial gas volume and charging pressure. N can equal at least three (3) or more accumulators.

Each accumulator can comprise a sealed vessel having a first portion including a compressible gas and a second portion that receives hydraulic fluid from the interior chamber, the first and second portions being separated by a movable element acted upon the hydraulic fluid for displacement only after the charging pressure of the contained gas in the first portion is exceeded.

According to another aspect, there is provided an apparatus for creating a pseudo-linear spring force for a hydro-pneumatic spring isolator under load, the spring isolator comprising a cylinder having a hollow interior partially filled with a hydraulic fluid and a piston assembly movable within the hollow interior and defining a variable hydraulic chamber. According to this aspect, the apparatus comprises at least two accumulators disposed in parallel and fluidically connected to one another, including a first accumulator configured to be fluidically connected to the variable hydraulic chamber of the cylinder and the second accumulator, each accumulator comprising a sealed vessel having a first portion containing a compressible gas and a second portion configured to receive hydraulic fluid from the variable hydraulic chamber, the first and second portions being separated from one another by a movable element and wherein each accumulator includes an initial gas volume having a charging pressure.

The second accumulator according to an exemplary version is provided with a progressively higher charging pressure that the first accumulator in which a corresponding pressure force must exceed a threshold in order to active engage both the first and second accumulators.

For example, the second accumulator can also have a larger initial gas volume than that of the first accumulator.

A total of N accumulators can be disposed in parallel, in which each accumulator can be progressive in terms of at least one gas charging pressure and initial gas volume.

One advantage realized by the present invention is that of improved performance wherein spring function can be precisely controlled to achieve linear stiffness over operating stroke range.

Another advantage realized is providing and controlling linearity lowers resulting stress levels in the spring isolator assembly and drastically improving fatigue life.

Yet another advantage is that the herein described linearization technique can be easily modified to tailor different loads based on the variability of accumulators that can be added.

These and other features and advantages will be readily apparent from the following Detailed Description, which should be read in conjunction with the accompanying drawings.

DETAILED DESCRIPTION

The following relates to exemplary generic and specific embodiments of a pseudo-linear hydro-pneumatic spring isolation assembly or apparatus. Throughout the course of discussion, several terms are used to provide a suitable frame of reference with regard to the accompanying drawings such as "top", "bottom", "over", "under", "upper", "lower", "inner" "outer" and the like. These terms, however, should not be viewed as necessarily limiting of the inventive concepts described herein, unless so specifically indicated.

Referring to FIG. 1 and for background purposes, there is shown a prior art isolation assembly 100 including a hydro-pneumatic spring defined by a cylinder 110 having a hollow interior 112 and within which a piston assembly 150 is disposed for axial movement. The piston assembly 150 is defined by a piston head 154, which includes at least one sealing element, such as an O-ring 157. The piston head 154 is attached to the distal end of a piston rod 158 which is movable within the hollow interior 112 of the cylinder 110. A hydraulic chamber 116 is defined at one end of the cylinder 110 through which the piston head 154 moves, the chamber 116 containing a hydraulic fluid 120. The hydraulic chamber 116 is fluidically connected by means of a flexible hose 117 to an accumulator 130, such as a cylinder accumulator. This accumulator 130 as shown is defined by a sealed vessel 134 that is charged with a quantity of a compressible gas, such as nitrogen, disposed in an upper portion 138 of the sealed vessel 134 and charged with a specific pressure. The upper portion 138 and a lower portion 137 of the accumulator 130 are separated by a movable element 139, shown schematically, such as a cylinder or plate, is acted upon by the compressible gas and in which the flexible hose 117 is fluidically connected to the lower portion 137 of the accumulator 130.

In use, one end 144 of the cylinder 110 is attached to ground or a fixed base support, while the remaining end 148 of the cylinder 110 having a proximal end of the movable piston rod 158 is attached to a structure (not shown). Though not shown for purposes of clarity, a plurality of cylinder assemblies can be similarly attached to a structure for purposes of support.

While under a tensile load, the piston assembly 150 including the piston head 154 is caused to move as shown per arrow 140 towards an extended position through the interior 112 of the cylinder 110 and more specifically the hydraulic chamber 116. This axial stroke of the piston assembly 150 causes displacement of the contained hydraulic fluid 120 within the hydraulic chamber 116 as the piston head 154 is moved therethrough as the size (volume) of the chamber 116 is variable in terms of volume and caused to shrink. As a result and when the piston assembly 150 is moved outwardly, the piston head 154 causes displacement of the hydraulic fluid 120 from the cylinder 110 through the flexible hose 117 and in which the resulting pressure force of the displaced fluid acts upon the movable element 139 of the charging accumulator 130 to further cause relative movement of the movable element 139 when the pressure of the fluid 120 exceeds that of the charging pressure of the gas. The contained gas is therefore compressed in the upper portion 138 of the accumulator vessel 134, creating a spring force based on the displacement (stroke) of the contained piston assembly 150 within the cylinder 110 with the accumulator 130.

Figure 2:
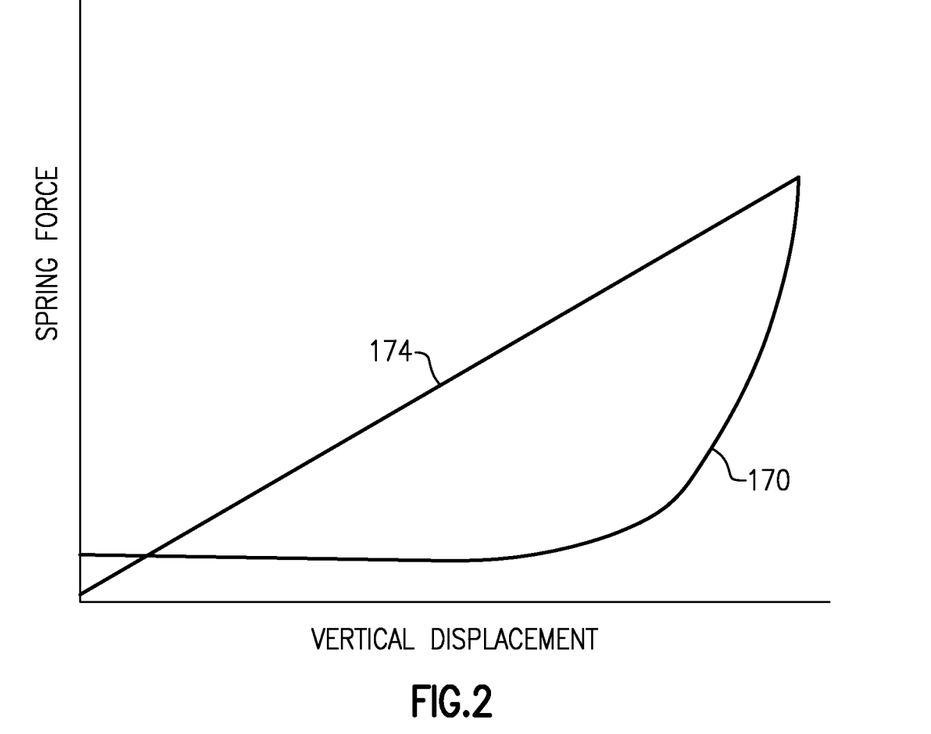
FIG. 2 is a graphical output of spring force versus displacement for the hydro-pneumatic spring isolation assembly of FIG. 1, as compared to an unrealized linear output.

Referring to FIG. 2, there is shown an exemplary graphical output of spring force, versus displacement of the piston assembly 150 for the herein described isolator assembly 100. As can be readily discerned from this graph 170, the relationship between spring force and displacement for the herein described isolator assembly 100 varies significantly versus a desired linear output that is unattainable with the isolation assembly 100, shown for comparison as curve 174 over the displacement of this system.

Figure 3:
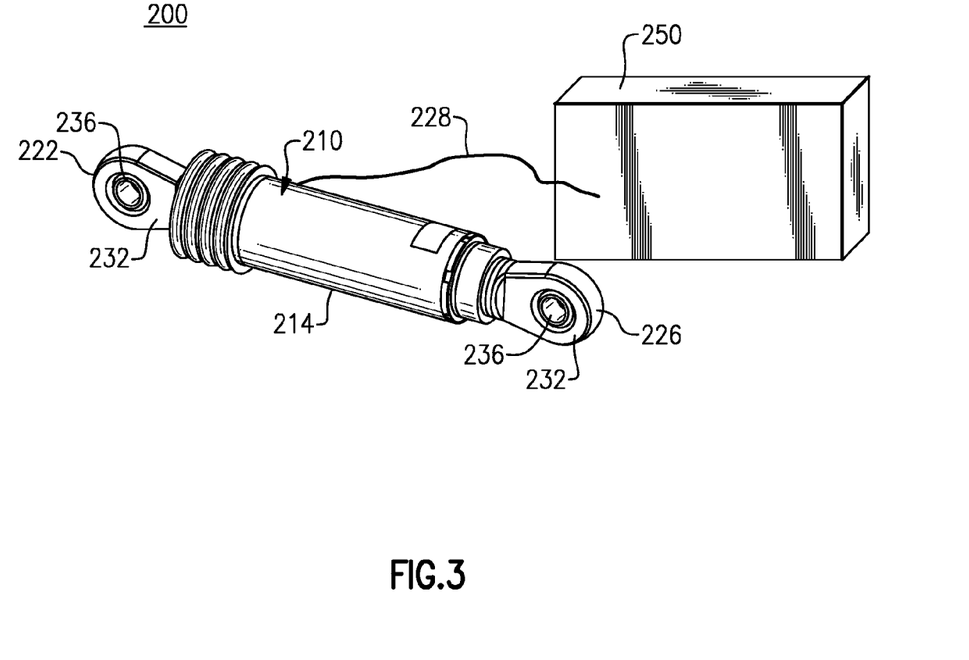
FIG. 3 is a perspective view of a pseudo-linear hydro-pneumatic spring isolation assembly in accordance with an exemplary embodiment.
Figure 4:
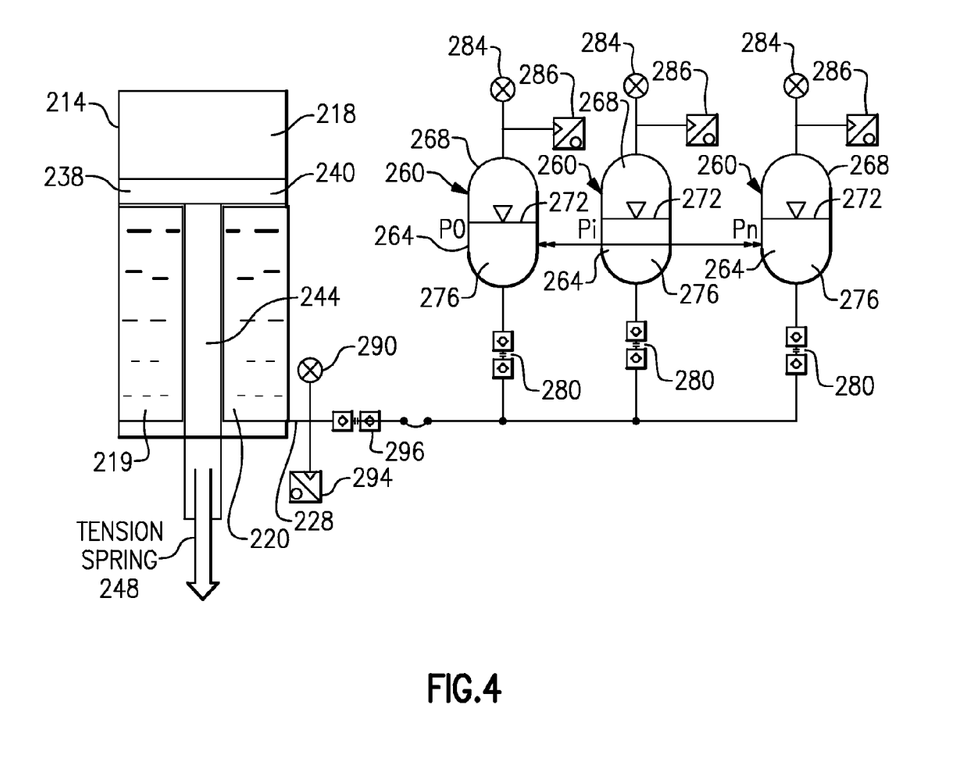
FIG. 4 is a schematic diagram of a pseudo-linear hydro-pneumatic spring isolation assembly in accordance with the present invention.

Referring to FIGS. 3 and 4, there is illustrated an isolation assembly 200 made in accordance with an exemplary embodiment. More specifically and similar to the preceding, a hydro-pneumatic spring isolator 210 is provided. As in the preceding, the hydro-pneumatic spring isolator 210 is defined by a cylinder 214 having an interior 218, shown schematically in FIG. 4, as well as opposed axial ends 222, 226. According to this version, end 226 is fixed while end 222 is axially movable as part of a piston assembly 238, shown only in FIG. 4. Each opposing axial end 222, 226 of the cylinder 214 includes an attachment member 232 that further includes a spherical bearing 236 for engaging a structure and/or a base support (not shown). According to this embodiment, the cylinder 214 is fluidically connected to an enclosure 250, discussed below by means of a flexible hose 228.

Referring more specifically to FIG. 4 and as schematically depicted, a portion of the interior 218 of the cylinder 214 defines a hydraulic chamber 219 retaining a quantity of hydraulic fluid 220. As noted, the piston assembly 238 is disposed at one end 222, FIG. 3, of the cylinder 214 including a piston head 240 attached to a distal end of a piston rod 244 and in which a proximal end of the piston rod 244 receives the attachment member 232, FIG. 3. The piston head 240 is sealed and movable through the interior of the cylinder 214 and sealingly matched with the interior 218 of the cylinder 214 to define the hydraulic chamber 219, whose volume varies with the axial stroke of the piston assembly 238 and in which the volume is decreased based on outward movement of the piston assembly 238 according to the direction shown by arrow 248.

Still referring to FIG. 4 and as shown schematically, a plurality of N accumulators 260 are fluidically connected in parallel with the cylinder 214 within the enclosure 250 or otherwise. The enclosure 250 itself is not shown in this view for clarity. Each of the N accumulators 260 (three (3) of which are exemplarily shown in this diagram) are commonly defined by sealed vessels 264 that contain a volume of a gas (such as nitrogen) in an upper portion 268 relative to a contained movable element 272, such as a cylinder, initially in a bottomed portion in the vessel 264. The gas is supplied from a source, not shown, using appropriate valves 284 and flow control elements 286. The lower portion 276 of each accumulator vessel 264 is tethered to a hose or other conduit, such as through quick connects 280 and in which the flexible hose 228 can also be attached to the accumulators 260 using quick connects 296 wherein the hose 228 can also be bled as needed using valve 290 and flow control elements 294. The foregoing is also used to initially fill the cylinder chamber 219 with hydraulic fluid. As discussed herein, each of the N number of accumulators are different in terms of their relative size (initial gas volume) and their gas charging pressure (i.e. the amount of force required to cause movement of the movable element disposed within the accumulator 260). As depicted, the charging pressures are noted by an initial pressure $P_0$ for the first accumulator and iterative charging pressures $P_i$ for successive number of accumulators up to N, the latter accumulator having a charging pressure of $P_n$. The number of accumulators (N) can be suitably varied, as discussed herein.

Figure 5:
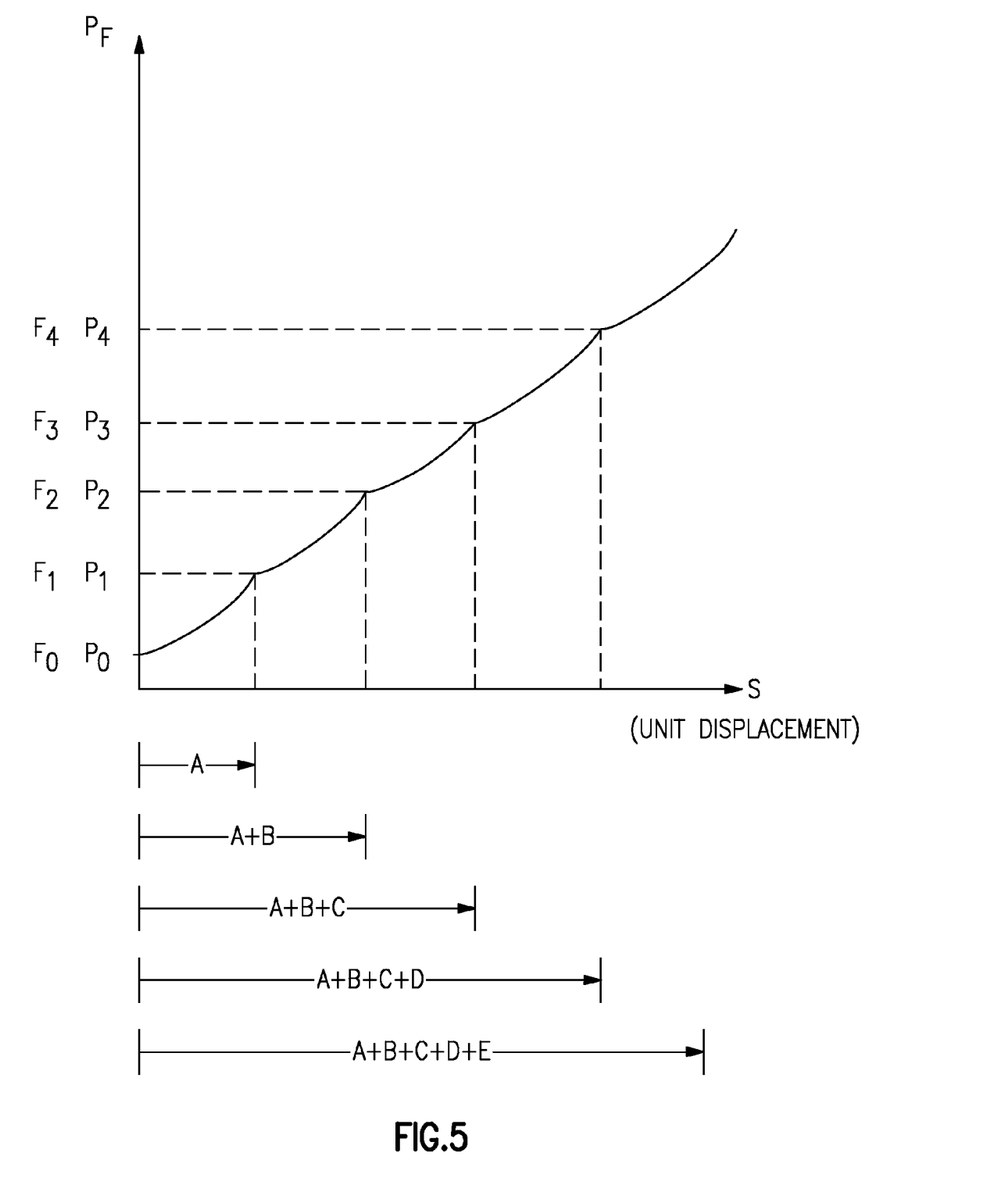
FIG. 5 is a graphical output of spring force versus displacement, illustrating the operating principles of an exemplary version of the pseudo-hydro-pneumatic spring isolation assembly.

Utilizing the basic generic setup of FIG. 4, reference is herein made to FIG. 5 and according to a specific example in which a series of five (i.e., N=5) cylinder accumulators (herein designated as A, B, C, D and E, respectively) are disposed in parallel with one another. Each of the accumulators are commonly defined by sealed vessels that include an upper portion and a lower portion that are variable in size and separated by a movable element (i.e., a sealed cylinder). According to this embodiment, each successive accumulator is progressively larger is size and wherein an initial gas volume and charging pressure are shown for each accumulator (A, B, C, D, E), as follows:

| Accumulator | Initial Gas Volume (liters) | Charging Pressure (bar) |
|---|---|---|
| A | 3.00 | 10 |
| B | 4.00 | 40 |
| C | 5.00 | 74 |
| D | 6.00 | 110 |
| E | 6.00 | 150 |

As noted, each of the accumulators A, B, C, D, E are fluidically connected in parallel with one another and with the interior 218 of the cylinder 214 by means of a flexible hose or hoses, as shown generically according to FIG. 4.

Still referring to FIG. 5, a graphical and sequential illustration is provided that illustrates the operating principles of the herein described arrangement. Initially, and over an initial range of displacement (stroke) of the piston assembly within the cylinder, the first accumulator A is actively engaged with the assembly 200 once a pressure force equivalent to 10 bars ($P_0$) is reached, equating a first threshold that is sufficient to only engage the movable element of the first accumulator though all accumulators are connected to one another in parallel. As the resulting pressure force increases based on compression/displacement of the fluid and the available volume in the first accumulator A, this force eventually reaches a value of $P_1$, which is also sufficient to overcome the movable element of the second accumulator B and thereby actively engaging each of the first and second accumulators with the connected cylinder 214. In similar fashion and as succeeding threshold pressures $P_2$, $P_3$ and $P_4$ are attained by the system, each of the remaining series accumulators C, D and E are also sequentially caused into active engagement with the hydraulic fluid 220, FIG. 3, of the cylinder 214. As noted and according to this concept, each accumulator is caused to fluidically interact with the cylinder 214 only after a threshold pressure has been reached. For example, the first accumulator will be caused to move the contained cylinder only after a first threshold pressure has been reached that exceeds the gas charging pressure of the accumulator. Because the remaining accumulators are each defined by a gas charging pressure that is higher than the first threshold pressure ($P_0$) and the cylinders within these accumulators are bottomed, none of the remaining accumulators are initially caused to react. As the displacement (stroke) of the piston increases and the fluid contained within the hydraulic chamber continues to compress, the pressure force steadily rises until a second threshold pressure is reached that causes movement of the cylinder of the second accumulator in tandem with the first accumulator. Because the second threshold pressure is still lower than the charging pressure of the remaining accumulators, only the first and second accumulators are fluidically engaged with the cylinder 214. The resulting effects are shown graphically as each accumulator is sequentially engaged following a predetermined displacement (stroke (S)) of the piston, producing a corresponding pressure force.

This progression continues as shown graphically according to FIG. 5 as each pressure threshold has been reached, depending upon the load applied and the overall displacement thereby involving each of the multiple number of accumulators. The movable cylinders in each of the accumulators react so as to reach equilibrium within the vessels based on the contained gas and in which the piston is caused to move inwardly relative to the spring. The resulting effects more closely mimic linearity over the effective displacement of the piston in a repeatable fashion. It can be seen that increasing the number of accumulators in this fashion can further improve the linearity that can be produced.

PARTS LIST FOR FIGS. 1-5

100 hydraulic spring isolation assembly
110 cylinder
112 interior, hollow
116 chamber, hydraulic
117 flexible hose
120 hydraulic fluid
130 accumulator
134 vessel, sealed
137 lower portion
138 upper portion
139 movable element
140 arrow, force tensile
144 end, cylinder
148 end, cylinder
150 piston assembly
154 piston head
157 O-ring
158 piston rod
200 isolation assembly
214 cylinder 218 interior
219 chamber, hydraulic
220 fluid, hydraulic
222 opposed axial end
226 opposed axial end
228 flexible hose
232 attachment member
236 spherical bearing
238 piston assembly
240 piston head
244 piston rod
248 arrow
250 enclosure
260 accumulator
264 vessel, sealed
268 upper portion
272 movable element
276 lower portion
280 quick connects
284 valve
286 flow control element
290 valve
294 quick connects
296 flow control element
A accumulator
B accumulator
C accumulator
D accumulator
E accumulator
$P_o$ gas charging pressure
$P_i$ gas charging pressure
$P_n$ gas charging pressure It will be readily apparent that other variations and modifications can be made in accordance with the inventive concepts that are described herein, and according to the following claims.

The invention claimed is:

1. A pseudo-linear hydro-pneumatic isolator assembly, comprising:
    a cylinder having an interior partially filled with a hydraulic fluid;
    a piston assembly including a piston head and a piston rod attached to one end and movable within the interior of the cylinder, defining a variable hydraulic chamber;
    at least two accumulators fluidically connected in parallel with the defined variable hydraulic chamber of the cylinder, the at least two accumulators being configured to provide a pseudo linear spring force over an axial stroke of the piston assembly,
    wherein each of the at least two accumulators is defined by a vessel having a first portion containing a compressible gas and a second portion that receives hydraulic fluid from the chamber, the first and second portions being separated by a movable element acted upon the hydraulic fluid for displacement only after the charging pressure of the contained gas in the first portion exceeds a threshold pressure including a first accumulator charged to a first charging pressure and a second accumulator charged to a second charging pressure that is larger than the first charging pressure, wherein
    displacement of the piston assembly creates a variable pressure force, the variable pressure force causing active engagement with the first accumulator when the variable pressure force exceeds the first charging pressure and causing active engagement with both the first and second accumulators when the variable pressure force exceeds the second charging pressure, thereby creating a pseudo linear spring force.

2. The isolation apparatus of claim 1, wherein the at least two accumulators comprises a third accumulator in parallel with the first accumulator and second accumulator, the third accumulator being charged to a third pressure that is higher than either the first and the second pressure, and wherein each of the first, second and third accumulators are all actively and cumulatively engaged when the variable pressure force exceeds the third charging pressure.

3. The isolation apparatus of claim 1, in which the vessel disposed in each accumulator has a different initial gas volume.

4. The isolation apparatus of claim 1, in which a total of N accumulators are disposed in parallel fluidically with the hydraulic chamber and in which each succeeding accumulator of the N accumulators is larger in at least one of volume and charging pressure to create the pseudo linear spring rate for the assembly based on sequential and cumulative active engagement of the parallel disposed accumulators.

5. A method for substantially linearizing a hydro-pneumatic spring isolation assembly, the method comprising:
    providing a cylinder having an interior hydraulic chamber and a piston assembly movable within the chamber to vary the size of the hydraulic chamber; and
    connecting at least two accumulators in parallel, including a first accumulator and a second accumulator to the cylinder, each accumulator being defined by a sealed vessel that includes a first portion contained a compressible gas and a second portion that receives hydraulic fluid from the interior hydraulic chamber, the first and second portions being separated by a movable element acted upon the hydraulic fluid for displacement only after the charging pressure of the contained compressible gas in the first portion exceeds a threshold pressure, in which the first accumulator has a charging pressure that is less than the charging pressure of the second accumulator, and wherein each of the accumulators are actively and cumulatively engaged only after the charging pressure of each accumulator is exceeded that by a variable pressure force caused by displacement of fluid from the hydraulic chamber, thereby creating a substantially linearized spring rate.

6. The method of claim 5, comprising the step of providing at least some of said accumulators with a increasingly greater initial gas volume.

7. The method of claim 5, including the step of connecting at least four said accumulators in parallel with the cylinder, each of the accumulators having a charging pressure in which $P_1 < P_2 < P_3 \ldots P_N$, in which $P_1$, $P_2$, and $P_3$ and $P_N$ are the charging pressures of the first, second, third, and $N_{th}$ accumulator respectively.

8. An apparatus for creating a pseudo-linear spring force for a hydro-pneumatic spring isolator under load, said spring comprising a cylinder having a hollow interior partially filled with a hydraulic fluid and a piston assembly movable within the hollow interior and defining a variable hydraulic chamber, the apparatus comprising:
    at least two accumulators disposed in parallel and fluidically connected to one another and the interior chamber, including a first accumulator and a second accumulator, each of the at least two accumulators comprising a sealed vessel having a first portion containing a compressible gas and a second portion configured to receive hydraulic fluid from the variable hydraulic chamber, the first and second portions being separated from one another by a movable element and wherein each accumulator includes an initial gas volume having a charging pressure, wherein the second accumulator has a charging pressure which is greater than the first accumulator, the at least two accumulators being actively engaged cumulatively and progressively and in which the movable element of each of the at least two accumulators is moved only when the charging pressure is exceeded, thereby creating a pseudo linear spring rate based on the cumulative and progressive engagement of the at least two accumulators with the cylinder.

9. The apparatus of claim 8, wherein the second accumulator has a larger initial gas volume than the first accumulator.

10. The apparatus of claim 8, comprising a total of N accumulators disposed in parallel and in which each accumulator is progressively and cumulatively engaged based upon differing gas charging pressures.

11. The apparatus of claim 10, wherein N equals at least four.

* * * * *